United States Patent
Takehana

(10) Patent No.: US 10,656,505 B2
(45) Date of Patent: May 19, 2020

(54) OPTICAL PROJECTION DEVICE AND PROJECTOR

(71) Applicant: SEIKO EPSON CORPORATION, Tokyo (JP)

(72) Inventor: Naoto Takehana, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 185 days.

(21) Appl. No.: 15/542,194

(22) PCT Filed: Jan. 7, 2016

(86) PCT No.: PCT/JP2016/000064
§ 371 (c)(1),
(2) Date: Jul. 7, 2017

(87) PCT Pub. No.: WO2016/121300
PCT Pub. Date: Aug. 4, 2016

(65) Prior Publication Data
US 2019/0137853 A1    May 9, 2019

(30) Foreign Application Priority Data

Jan. 27, 2015 (JP) ................................ 2015-013024
Jun. 29, 2015 (JP) ................................ 2015-129588

(51) Int. Cl.
*G03B 21/14* (2006.01)
*G02B 13/16* (2006.01)
(Continued)

(52) U.S. Cl.
CPC ............ *G03B 21/142* (2013.01); *G02B 7/04* (2013.01); *G02B 13/16* (2013.01); *G03B 21/28* (2013.01); *G03B 33/12* (2013.01)

(58) Field of Classification Search
CPC ........ G02B 7/04; G03B 21/28; G03B 21/142; G03B 21/00–64; H04N 9/31–3197
See application file for complete search history.

(56) References Cited

U.S. PATENT DOCUMENTS

| 8,641,208 B2 | 2/2014 | Amano et al. |
| 2006/0182432 A1* | 8/2006 | Yumiki ................. G02B 7/026 396/72 |

(Continued)

FOREIGN PATENT DOCUMENTS

JP    2010-91635 A    4/2010

OTHER PUBLICATIONS

Apr. 5, 2016 International Search Report issued in International Patent Application No. PCT/JP2016/000064.

*Primary Examiner* — Isiaka O Akanbi
*Assistant Examiner* — Christopher A Lamb, II
(74) *Attorney, Agent, or Firm* — Oliff PLC

(57) ABSTRACT

A optical projection device disposed close to a projection surface and capable of further widening an angle is provided. A optical projection device includes first optical system including lens groups movable and second optical system reflecting light emitted from the first optical system. The first optical system includes first lens frame which holds first lens group positioned at side closest to the second optical system among the movable lens groups and includes cam pin, guide barrel which includes straight groove, cam barrel which includes cam groove with which the cam pin is engaged, the first lens frame includes frame protruding portion protruding from the cam barrel to second optical system side and holding the first lens group, and notch is provided in such way that portion is formed to be cut out at side through which light reflected by the second optical system passes, in the frame protruding portion.

12 Claims, 6 Drawing Sheets

(51) Int. Cl.
*G02B 7/04* (2006.01)
*G03B 21/28* (2006.01)
*G03B 33/12* (2006.01)

(56) References Cited

U.S. PATENT DOCUMENTS

2008/0218706 A1* 9/2008 Adachi .................. G03B 21/28
                                                    353/98
2011/0292355 A1* 12/2011 Amano .................. G02B 7/021
                                                    353/98

* cited by examiner

OPTICAL PROJECTION DEVICE AND PROJECTOR

TECHNICAL FIELD

The present invention relates to a optical projection device and a projector.

BACKGROUND ART

In the related art, a projector which modulates light emitted from a light source according to image information and projects modulated light on a projection surface such as a screen is known. A projector (projection image display device) which is disposed close to the projection surface and includes a reflection optical system so as to make it possible to project an image by widening an angle is proposed (for example, see PTL 1).

The projection image display device described in PTL 1 includes an image light generating unit which generates image light and a projection optical system which projects image light emitted from the image light generating unit onto a projection surface. The projection optical system includes a refractive optical system and a reflection optical system reflecting image light emitted from the refractive optical system.

The refractive optical system includes a rear-stage casing provided at a side near the image light generating unit, a front-stage casing provided at a side far from the image light generating unit, a plurality of lens groups disposed in the rear-stage casing, and a plurality of lens groups disposed in the front-stage casing.

The front-stage casing includes a plurality of holding tools that respectively hold the plurality of lenses disposed inside thereof, a first mirror frame in which a straight groove is formed, and a second mirror frame in which a cam groove is formed. Each holding tool includes a guide pin and moves to the straight groove in such a way that the guide pin is disposed by being fitted into the straight groove and the cam groove and the second mirror frame is rotated. That is, the refractive optical system is configured in such a way that the second mirror frame is rotated and accordingly, lens held in each holding tool is moved along an optical axis of the refractive optical system and focus adjustment or the like is possible.

The reflection optical system includes a reflection mirror, for example, an aspherical mirror having a concave surface and reflects image light emitted from the refractive optical system.

CITATION LIST

Patent Literature

PTL 1: JP-A-2010-91635

SUMMARY OF INVENTION

Technical Problem

However, the technique described in PTL 1 needs to set an angle of arrangement of the reflection mirror with respect to an optical axis of the refractive optical system or an angle of a spread of image light in the reflection mirror so that light reflected by the reflection optical system is not shielded by the front-stage casing of the refractive optical system. That is, there is a problem that when the angle of arrangement of the reflection mirror is increased, a position of a projected image becomes far away from the projector, or when the angle of the spread of image light in the reflection mirror is decreased, angle widening is insufficient. That is, there is a problem that proximate projection or a size of the projected image is insufficient in the projection image display device described in PTL 1.

Solution to Problem

The invention is intended to solve at least some of the problems described above and may be realized by the following aspects or application examples.

Application Example 1

A optical projection device according to the present application example is a optical projection device including a first optical system including lens groups movable along an optical axis and a second optical system reflecting light emitted from the first optical system, in which the first optical system includes a first lens frame which holds a first lens group positioned at a side closest to the second optical system side among the movable lens groups and includes a cam pin protruding in a direction orthogonal to the optical axis, a guide barrel which includes a straight groove along the optical axis and in which the cam pin is inserted into the straight groove, and a cam barrel which includes a cam groove into which the guide barrel is fitted and with which the cam pin protruding from the straight groove is engaged, is rotated with respect to the guide barrel to guide the cam pin by the straight groove and the cam groove, and moves the first lens frame along the optical axis, the first lens frame includes a frame protruding portion protruding from the cam barrel to a second optical system side and holding the first lens group, and a notch is provided in such away that a portion of an end portion of the second optical system side is formed to be cut out at a side through which light reflected by the second optical system passes, in the frame protruding portion.

According to this configuration, the frame protruding portion protrudes from the cam barrel and the cam pin is engaged with the cam groove of the cam barrel to be supported thereon in the first lens frame. Accordingly, the notch is formed at the position described above in the end portion of the second optical system side of the frame protruding portion. With this, it becomes possible to provide a configuration in which the cam barrel can be miniaturized in a direction along the optical axis, the cam barrel can be arranged at a light incidence side with respect to the first lens frame, and the first lens frame is guided even when the guide barrel is formed not to have a shape in a region outside from the vicinity of the notch.

Accordingly, the second optical system is configured in such a way that light emitted from the first optical system and reflected by the second optical system passes through the vicinity of the first optical system so as to make it possible to provide the optical projection device projecting light from the vicinity of the projection surface. Since the first lens frame holds the first lens group positioned at a side closest to the second optical system side among the movable lens groups and the notch is formed, it is possible to form a region in which light reflected by the second optical system is not shielded by the first optical system to be wider, compared to a configuration in which the cam barrel is formed to cover almost all of the first lens frames. Accordingly, it is possible to provide the optical projection device disposed close to the projection surface and capable of further widening an angle.

Application Example 2

In the optical projection device according to the application example described above, it is preferable that the notch is inclined to approach the optical axis as it goes to the second optical system.

According to this configuration, it is possible to form the region in which light reflected by the second optical system is not shielded by the first optical system to be wider and it becomes possible to provide a space in which a member can be disposed at the notch inside the frame protruding portion and a region in the vicinity of the cam barrel. Accordingly, it becomes possible to provide a optical projection device in which miniaturization due to efficient arrangement of constitutional members is achieved or optical performance is enhanced.

Application Example 3

In the optical projection device according to the application example described above, it is preferable that the first optical system includes a second lens group disposed at a light incidence side of the first lens group and a second lens frame holding the second lens group and including the cam pin guided by the straight groove and the cam groove, and the second lens frame is disposed in such a way that at least a portion of the second lens group is movable to the inside of the notch in the first lens frame.

According to this configuration, the first optical system includes the second lens group disposed at the light incidence side of the first lens group and the second lens frame holding the second lens group is disposed to be movable to the position described above. With this, since it is possible to make the notch larger, it becomes possible to provide a optical projection device disposed closer to the projection surface and achieving further widening of an angle.

Application Example 4

In the optical projection device according to the application example described above, it is preferable that the guide barrel includes a barrel protruding portion which protrudes from the cam barrel to the second optical system side and the barrel protruding portion is able to dispose the frame protruding portion inside and has a shape to be removed so as to expose the notch.

According to this configuration, it becomes possible to provide a configuration in which the region in which light reflected by the second optical system is not shielded by the first optical system can be formed to be wider and the frame protruding portion protruding from the cam barrel is guided using the barrel protruding portion. Furthermore, since the first lens frame can be inserted into the guide barrel from the second optical system side of the guide barrel, it becomes possible to provide a configuration in which the first lens frame is assembled into the guide barrel without being influenced by a shape of the light incidence side of the guide barrel (for example, a shape for fixing a lens group disposed at the light incidence side of the guide barrel).

Application Example 5

In the optical projection device according to the application example described above, it is preferable that the first lens group is the lens contributing to focus adjustment.

According to this configuration, it becomes possible to provide a optical projection device having a focus adjustment function, disposed closer to the projection surface, and capable of achieving further widening of an angle.

Application Example 6

In the optical projection device according to the application example described above, it is characterized in that the first lens frame holds the first lens group and includes a holding portion fitted into the guide barrel, the cam pin is integrally formed with the holding portion and has a tapered shape in which a tip portion becomes gradually thinner toward an end edge, and the cam groove is formed at the inner surface of the cam barrel and has a sectional shape with which the tip portion is engaged.

According to this configuration, the cam pin and the holding portion are integrally formed, the tip portion protruding from the straight groove of the guide barrel is formed in a tapered shape in the cam pin, and the tip portion is engaged with the cam groove formed in the inner surface of the cam barrel. With this, it is possible to easily combine the first lens frame in a state of holding the first lens group, the guide barrel, and the cam barrel.

It becomes possible to provide the optical projection device exhibiting the following effects compared to a configuration in which the cam groove is formed as a through hole and a cylindrical cam follower having the same function as the cam pin is fixed to a lens frame from the outside of the cam barrel by a screw. That is, in the configuration in which the cam follower is fixed by a screw, a positioning protrusion of the cam follower and the lens frame in the peripheral direction or a part for screw fixing need to be provided and the lens frame, that is, the cam barrel becomes larger in a radial direction. Furthermore, in the configuration in which the cam follower is fixed by a screw, since the cam groove is formed as the through hole, it is not possible to make an interval between adjacent cam grooves too small in order to cause the cam follower to be engaged. In contrast, in the optical projection device of the present application example, since the cam pin and the cam groove are formed as described above, it becomes possible to miniaturize the cam barrel in the radial direction or form the interval between adjacent cam grooves to be small. Accordingly, it becomes possible to provide a optical projection device in which the cam barrel is easily arranged in the region in which light reflected by the second optical system is not shielded and the degree of freedom of formation of the cam groove is enhanced.

Application Example 7

A projector according to the present application example includes alight source, an optical modulation device that modulates light emitted from the light source according to image information, and the optical projection device described above that projects light modulated by the optical modulation device.

According to this configuration, it is possible to provide a projector disposed close to the projection surface such as a screen and capable of widening an angle of an image and projecting the image.

DESCRIPTION OF EMBODIMENTS

Hereinafter, description will be made on a projector according to the present embodiment.

A projector of the present embodiment is configured to be able to project an image on a projection surface such as a screen in a state of being supported on a support tool installed at a wall surface or the like or a state of being placed on a desktop or the like.

Figure 1:
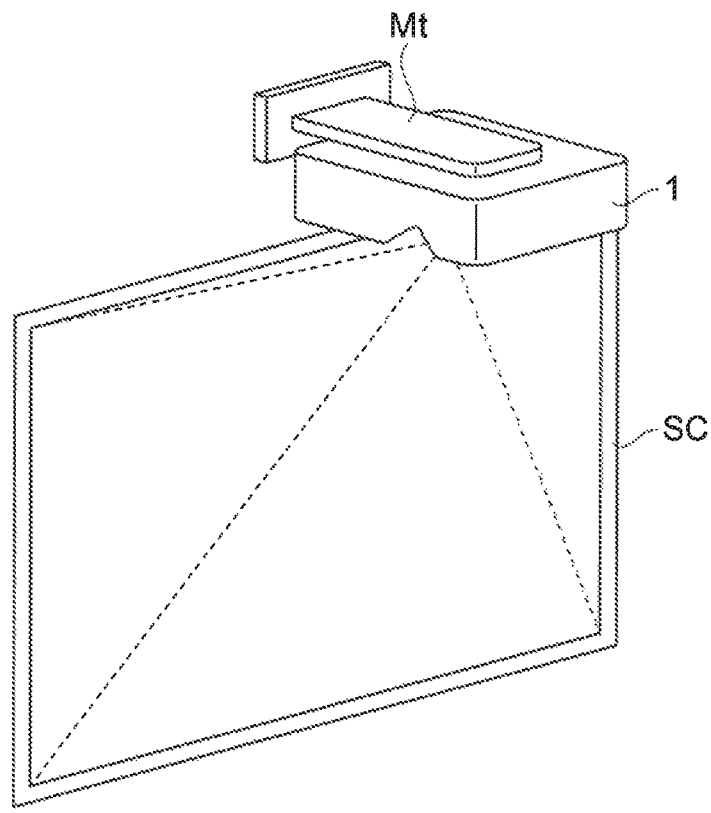
FIG. 1 is a diagram schematically illustrating an example of a usage pattern of a projector of the present embodiment.
Figure 1:
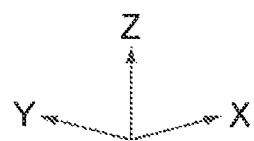

FIG. 1 is a diagram schematically illustrating an example of a usage pattern of a projector 1 of the present embodiment. Specifically, FIG. 1 is a diagram schematically illustrating the projector 1 supported on a support tool Mt installed on the wall surface and a screen SC disposed on the wall surface.

The projector 1 is installed above the screen SC and projects an image on the screen SC from a side directed downward, as illustrated in FIG. 1. In the following, for convenience of explanation, a normal direction relative to the wall surface is described as a front-and-back direction, a direction toward the wall surface is described as the front direction (+Y direction), a direction in defiance of gravity is described as the up direction (+Z direction), the right side toward the wall surface is described as the right direction (+X direction) in the projector 1 supported on the support tool Mt. The projector of the present embodiment is configured to be able to project an image even in a posture at which the +Y side or the +Z side is placed on a desktop, a floor, or the like in the posture illustrated in FIG. 1.

[Main Configuration of Projector]

Figure 2:
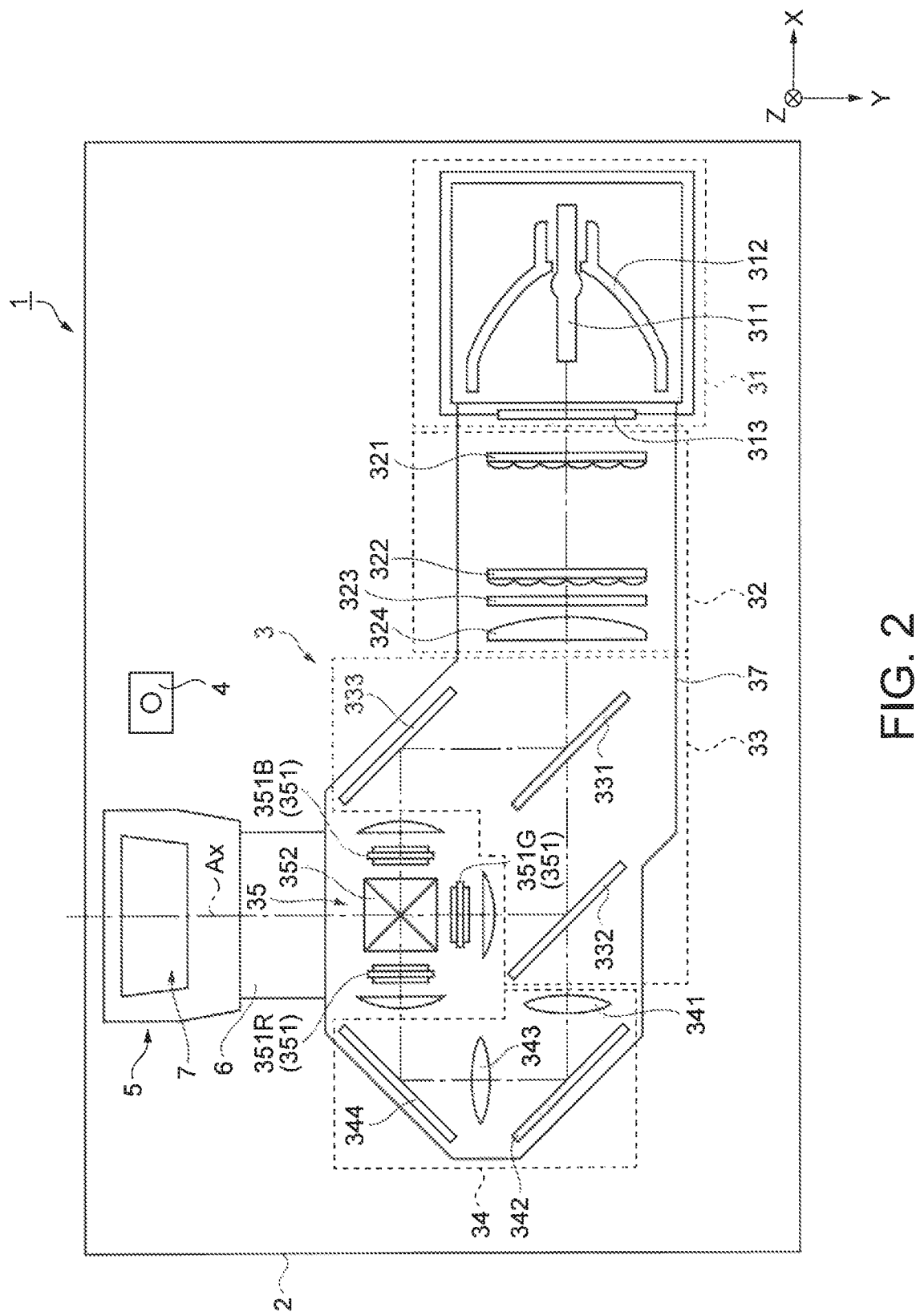
FIG. 2 is a diagram illustrating a schematic configuration of the projector of the present embodiment.

FIG. 2 is a diagram illustrating a schematic configuration of the projector 1 of the present embodiment.

As illustrated in FIG. 2, the projector 1 includes an outer casing 2 constituting an exterior, a controller (not illustrated), an optical unit 3 including a light source device 31, and an image-capturing device 4. Although illustration is omitted, a power supply device supplying power to the light source device 31, the controller, and the like or a cooling device which cools down the optical unit 3 or the like is disposed inside of the outer casing 2.

Although detailed description is omitted, the outer casing 2 is constituted with a plurality of members and is provided with an air inlet for taking outside air or an air outlet for exhausting air warmed inside the outer casing 2 to the outside.

The controller functions as a computer including a central processing unit (CPU), a read only memory (ROM), a random access memory (RAM), or the like and performs control of an operation of the projector 1, for example, control of image projection.

The optical unit 3 projects light by optically processing light emitted from the light source device 31 under control of the controller.

As illustrated in FIG. 2, the optical unit 3 includes an integrator illumination optical system 32, a color separation optical system 33, a relay optical system 34, an optical device 35, a optical projection device 5, and a casing 37 used for optical components and disposing these optical components at a predetermined position on an optical path, in addition to the light source device 31.

The light source device 31 includes a discharge type light source 311 configured with a super-high pressure mercury lamp, a metal halide lamp, or the like, a reflector 312, a collimating lens 313, and the like. The light source device 31 reflects light emitted from the light source 311 by the reflector 312, arranges an emission direction by the collimating lens 313, and then emits light toward the integrator illumination optical system 32.

The integrator illumination optical system 32 includes a first lens array 321, a second lens array 322, and a polarization conversion element 323, and a superimposed lens 324.

The first lens array 321 has a configuration in which small lenses are arrayed in a matrix shape and divides light emitted from the light source device 31 into a plurality of partial light beams. The second lens array 322 has substantially the same configuration as that of the first lens array 321 and together with the superimposed lens 324, substantially superimposes the partial light beams on a surface of a liquid crystal panel which will be described later. The polarization conversion element 323 has a function of arranging random light beams emitted from the second lens array 322 into one type of polarized light beams capable of being used in the liquid crystal panel.

The color separation optical system 33 includes two dichroic mirrors 331 and 332 and a reflection mirror 333 and has a function of separating light emitted from the integrator illumination optical system 32 into color light beams of 3 colors of red light beam (hereinafter, referred to as "R light"), green light beam (hereinafter, referred to as "G light"), and blue light beam (hereinafter, referred to as "B light").

The relay optical system 34 includes a light incidence side lens 341, a relay lens 343, and reflection mirrors 342 and 344 and has a function of guiding R light separated by the color separation optical system 33 to the liquid crystal panel for R light. In the optical unit 3, a configuration in which the relay optical system 34 guides R light is adopted, but is not limited thereto and may adopt, for example, a configuration in which the relay optical system 34 guides B light.

The optical device 35 includes optical modulation devices 351 (it is assumed that an optical modulation device of R light is 351R, an optical modulation device of G light is 351G, an optical modulation device of B light is 351B) provided for respective color light beams and a cross dichroic prism 352 as a color combining optical device.

Each of the optical modulation devices 351 includes a transmissive liquid crystal panel, a light incidence side polarization plate disposed at a light incidence side of the liquid crystal panel, and a light emission side polarization plate disposed at a light emission side of the liquid crystal panel and modulates respective color light beams according to image information.

The cross dichroic prism 352 has a substantially square shape to which four right-angle prisms are stuck in plan view and two dielectric multilayer films are formed at an interface at which right-angle prisms are stuck to each other. In the cross dichroic prism 352, the dielectric multilayer films reflect R light and B light modulated in the optical modulation devices 351R and 351B, allows G light modulated in the optical modulation device 351G to transmit, and combines three colors of modulated light beams.

Although details will be described later, the optical projection device 5 includes a first optical system 6 having an optical axis Ax and a second optical system 7 reflecting light emitted from the first optical system 6. The optical projection device 5 enlarges and projects light combined in the cross dichroic prism 352 to a screen SC disposed below the projector 1, as illustrated in FIG. 1.

The image-capturing device 4 includes an image-capturing element (not illustrated), for example, a charge coupled device (CCD), a complementary metal oxide semiconductor (CMOS), photographs a projection surface, and outputs photographed information to the controller. The image-capturing device 4 detects light emitted from an indication tool (for example, electronic pen) operated on the projection surface by a user and outputs detected information to the controller. The controller analyzes a position of the indication tool based on information output from the image-capturing device 4 and projects the analyzed result as an image in which for example, a locus of the indication tool is represented by points and lines.

[Configuration of Optical Projection Device]

The optical projection device 5 will be described in detail.

Figure 3:
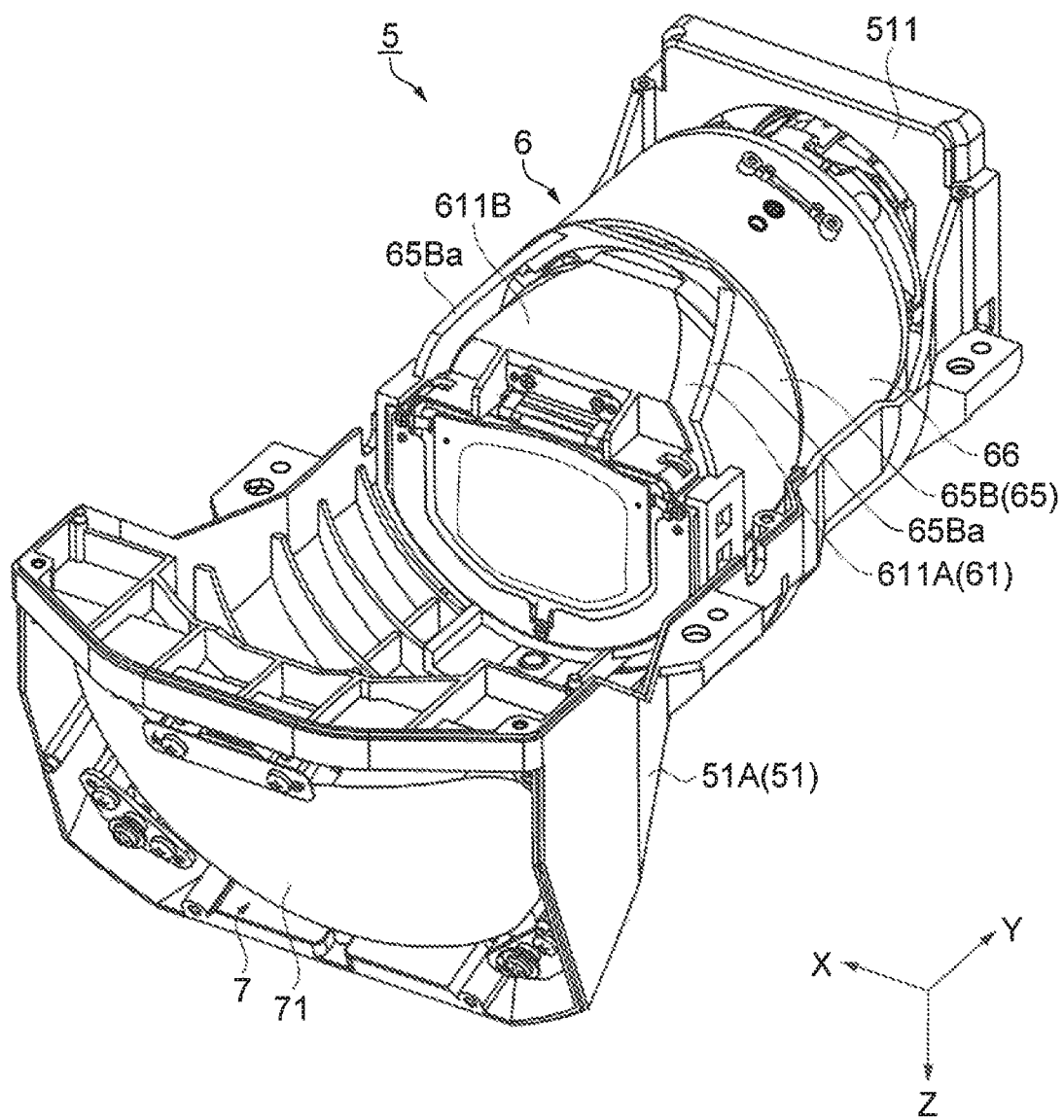
FIG. 3 is a perspective view of a optical projection device of the present embodiment.
Figure 4:
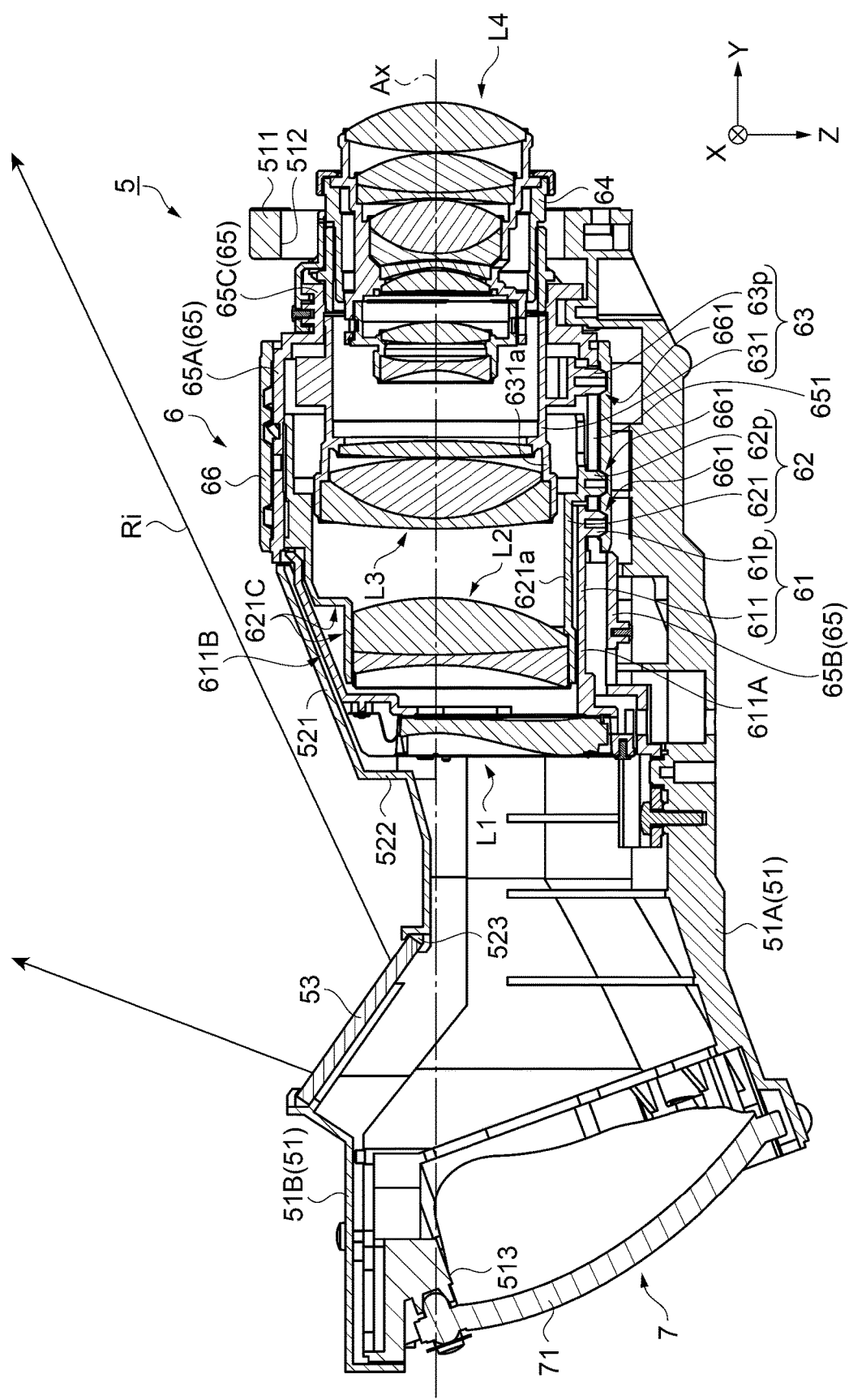
FIG. 4 is a cross-sectional view of the optical projection device of the present embodiment.

FIG. 3 is a perspective view of the optical projection device 5 and illustrates a state in which a cover 51B, which will be described later, is removed. FIG. 4 is a cross-sectional view of the optical projection device 5.

As illustrated in FIG. 3 and FIG. 4, the optical projection device 5 includes the first optical system 6 having a plurality of lens groups in which a single or a plurality of lenses disposed along the optical axis Ax are set as a single lens group and the second optical system 7 reflecting light emitted from the first optical system 6. As illustrated in FIG. 1, the direction along the optical axis Ax is assumed as ±Y direction in the projector 1 supported on the support tool Mt installed at the wall surface, and a light incidence side (optical path upstream side) onto which light combined in the cross dichroic prism 352 is incident becomes the +Y side and a light emission side (optical path downstream side, second optical system 7 side) becomes the −Y side in the first optical system 6.

The optical projection device 5 includes a casing 51 for optical projection and a light transmitting plate 53, in addition to the first optical system 6 and the second optical system 7 as illustrated in FIG. 4.

Figure 5:
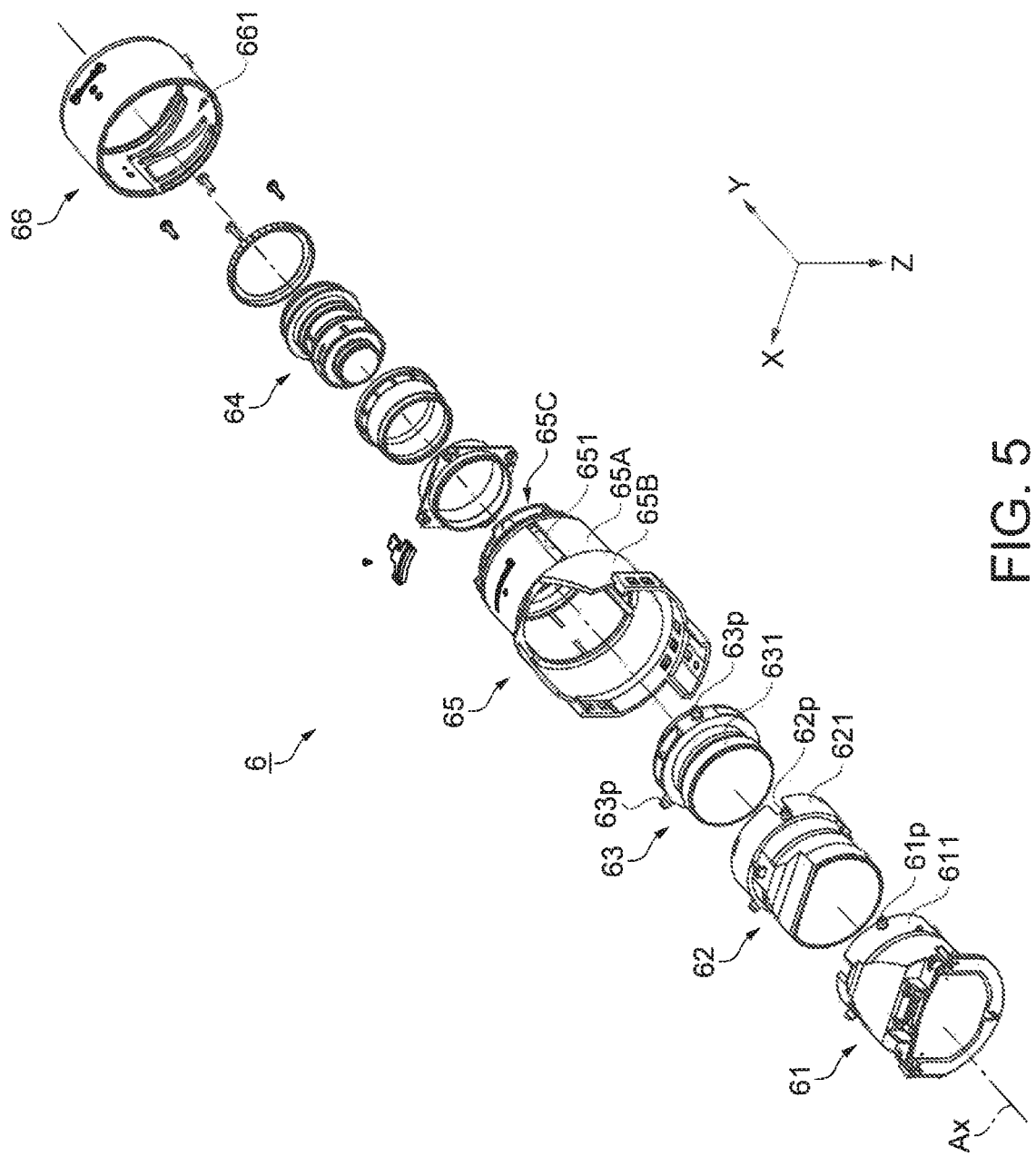
FIG. 5 is an exploded perspective view of a first optical system of the present embodiment.

FIG. 5 is an exploded perspective view of the first optical system 6.

The first optical system 6, as illustrated in FIG. 4 and FIG. 5, includes a first lens group L1 to a fourth lens group L4, a first lens frame 61 to a fourth lens frame 64 which respectively hold a first lens group L1 to a fourth lens group L4, a guide barrel 65, and a cam barrel 66 which are sequentially disposed toward the light incidence side (+Y side) from the light emission side (−Y side) along the optical axis Ax.

Specifically, the first lens group L1 is constituted with a single lens and is disposed closest to the light emission side (−Y side, second optical system 7 side) among a plurality of movable lens groups in the first optical system 6. A single lens constituting the first lens group L1 is formed with a synthetic resin aspherical lens and has a shape obtained by removing a portion of the −Z side from a circular shape in plan view and a portion of both of the left and right sides. The second lens group L2, the third lens group L3, and the fourth lens group L4 are respectively constituted with a plurality of lenses and are sequentially disposed in this order at the light incidence side of the first lens group (+Y side).

The second lens group L2 has a shape obtained by removing a portion of the −Z side from a circular shape in plan view.

The first lens frame 61 includes a cylindrical holding portion 611 holding the first lens group L1 and a plurality of cam pins 61p protruding from the holding portion 611 in a direction orthogonal to the optical axis Ax. That is, the holding portion 611 and the cam pin 61p are integrally formed.

The second lens frame 62 includes a cylindrical holding portion 621 holding the second lens group L2 and a plurality of cam pins 62p protruding from the holding portion 621 in a direction orthogonal to the optical axis Ax. That is, the holding portion 621 and the cam pin 62p are integrally formed.

The third lens frame 63 includes a cylindrical holding portion 631 holding the third lens group L3 and a plurality of cam pins 63p protruding from the holding portion 631 in a direction orthogonal to the optical axis Ax. That is, the holding portion 631 and the cam pin 63p are integrally formed.

Three cam pins are provided at substantially equal intervals of 120° in the circumferential direction around the optical axis Ax for each of the cam pins 61p, 62p, and 63p, the tip portion is formed in a tapered shape in which the edge portion becomes gradually thinner toward an end edge, and the tip portion is set to a length protruding from a straight groove 651, which will be described later, of the guide barrel 65.

Accordingly, the fourth lens frame 64 is formed in a cylindrical shape, holds the fourth lens group L4, and is fixed to the guide barrel 65.

As such, the optical projection device 5 includes the first lens group L1 to the third lens group L3 which are movable and the fourth lens group L4 fixed to the guide barrel 65 that are sequentially disposed toward the light incidence side which becomes the other side of the optical axis Ax from the light emission side which becomes one side of the optical axis.

The guide barrel 65 is formed with synthetic resin, has an opening in a front-and-back direction (±Y direction), and as illustrated in FIG. 4 and FIG. 5, includes a barrel fitting portion 65A fitted into the cam barrel 66 by insertion, a barrel protruding portion 65B having a cylindrical shape and provided on the −Y side of the fitting portion 65A, and a barrel mounting portion 65C provided on the +Y side of the fitting portion 65A.

The barrel protruding portion 65B has an outer diameter larger than an outer diameter of the fitting portion 65A and is formed to protrude from the cam barrel 66 to the −Y side (second optical system 7 side). In the fitting portion 65A, as illustrated in FIG. 5, three straight grooves 651 are formed along the optical axis Ax from a stepped portion formed with the fitting portion 65A and the barrel protruding portion 65B toward the +Y direction.

The inner diameter of the fitting portion 65A is set to a size capable of allowing the holding portions 631, 621, and 611 to be smoothly movable along the optical axis Ax and the inner diameter of the barrel protruding portion 65B is set to a size capable of allowing the entirety of each of the third lens frame 63, the second lens frame 62, and the first lens frame 61 to be inserted.

The mounting portion 65C has an outer diameter smaller than an outer diameter of the fitting portion 65A and is formed to protrude from the cam barrel 66 to the +Y side.

The third lens frame 63, the second lens frame 62, and the first lens frame 61 are inserted in this order from the barrel protruding portion 65B. Specifically, in the third lens frame 63, the second lens frame 62, and the first lens frame 61, the cam pins 63p, 62p, and 61p are inserted into the straight groove 651 and the holding portions 631, 621, and 611 are inserted into the fitting portion 65A. Although detailed description is omitted, the fourth lens frame 64 is fixed to the mounting portion 65C through a member. The guide barrel 65 is not limited to one made of synthetic resin and may include one made of metal such as aluminum.

The cam barrel 66 is made of a synthetic resin and has an opening in the front-and-back direction (±Y direction), the fitting portion 65A of the guide barrel 65 is fitted into the cam barrel 66, and the cam barrel 66 is formed to be rotatable around the optical axis Ax with respect to the guide barrel 65. A cam groove 661 (see FIG. 5) engaged with each of the cam pins 61p, 62p, and 63p protruding from the straight groove 651 is formed on the inner surface of the cam barrel 66. The cross-sectional shape of a cam groove 661, as illustrated in FIG. 4, is formed to be engaged with the tapered tip portions of the cam pins 61p, 62p, and 63p. Specifically, the cam groove 661 includes a bottom surface which is substantially parallel to the optical axis Ax and an inclined surface inclining with respect to the bottom surface, and is formed in a such a way that the bottom surface is separated from the cam pins 61p, 62p, and 63p and the inclined surface is engaged with the tip portions of the cam pins 61p, 62p, and 63p.

The cam groove 661 includes an introducing portion linearly formed along the optical axis Ax in order to introduce the cam pins 61p, 62p, and 63p and a defining portion which is branched from the introducing portion and defines movement of each of the first lens frame 61, the second lens frame 62, and the third lens frame 63.

The cam barrel 66 is attached to a lever not illustrated and is rotated by allowing the lever to be operated from the outside of the projector 1.

When the cam barrel 66 is rotated, the cam pins 61p, 62p, and 63p are guided to the straight groove 651 and the cam groove 661, and the first lens frame 61, the second lens frame 62, and the third lens frame 63 are moved along the straight groove 651 independently of each other. Respective movement amounts of the first lens frame 61, the second lens frame 62, and the third lens frame 63 are different from one another and the movement amount of the second lens frame 62 is set to become largest. The cam barrel 66 is rotated to thereby cause focus adjustment by the first optical system 6 to be performed. That is, the first lens group L1 to the third lens group L3 contribute to focus adjustment. This so-called focus adjustment is not limited to focal length adjustment but may include field curvature adjustment. The cam barrel 66 is not limited to one made of synthetic resin and may include one made of metal such as aluminum.

As illustrated in FIG. 4, the second optical system 7 includes a concave surface-shaped reflection mirror 71. The reflection mirror 71 widens an angle of light emitted from the first optical system 6 to be reflected, and allows light to pass through the vicinity of the first optical system 6. The second optical system 7 may be configured to include a plurality of mirrors or plane mirrors.

As illustrated in FIG. 4, the casing 51 for optical projection includes a casing body 51A and a cover 51B and accommodates the first optical system 6 and the second optical system 7.

As illustrated in FIG. 3 and FIG. 4, the casing body 51A is formed in a box shape opened at the −Z side, and in the casing body 51A, an insertion hole 512 into which the fourth lens frame 64 of the first optical system 6 is inserted is formed on the wall 511 of the +Y side, and an opening 513 closed by the reflection mirror 71 is formed on the wall of the −Y side.

The wall 511 is formed in a rectangular shape in plan view and the optical device 35 is attached to the surface of the +Y side of the wall 511 through a holding member which is not illustrated.

In the first optical system 6, the guide barrel 65 is fixed to the casing body 51A by a screw and is disposed inside the casing body 51A. The reflection mirror 71 is fixed to the casing body 51A by a screw through a member such as a leaf spring.

As illustrated in FIG. 4, in the casing body 51A, the cover 51B closes the −Y side of a part which opens at the −Z side and is formed such that the −Z side of the cam barrel 66 is exposed.

In the cover 51B, an inclination portion 521, a wall 522 extending to the +Z side from the end portion of the inclination portion 521, and an opening 523 through which light reflected from the reflection mirror 71 passes are formed to approach the optical axis Ax as it goes toward the second optical system 7 from the vicinity of an end portion of the −Y side of the cam barrel 66.

The light transmitting plate 53 is formed with plate material such as glass to have a rectangular shape and closes the opening 523 attached to the cover 51B.

Light emitted from the cross dichroic prism 352 refracts in the first optical system 6 and proceeds in the direction inclined to the +Z side rather than the optical axis Ax. Light emitted from the first optical system 6 is reflected by the second optical system 7, proceeds in the direction inclined to the −Z side rather than the optical axis Ax, is transmitted through the light transmitting plate 53, and is projected onto the screen SC.

Here, the first lens frame 61, the second lens frame 62, the third lens frame 63, and the guide barrel 65 will be described in further detail.

Figure 6:
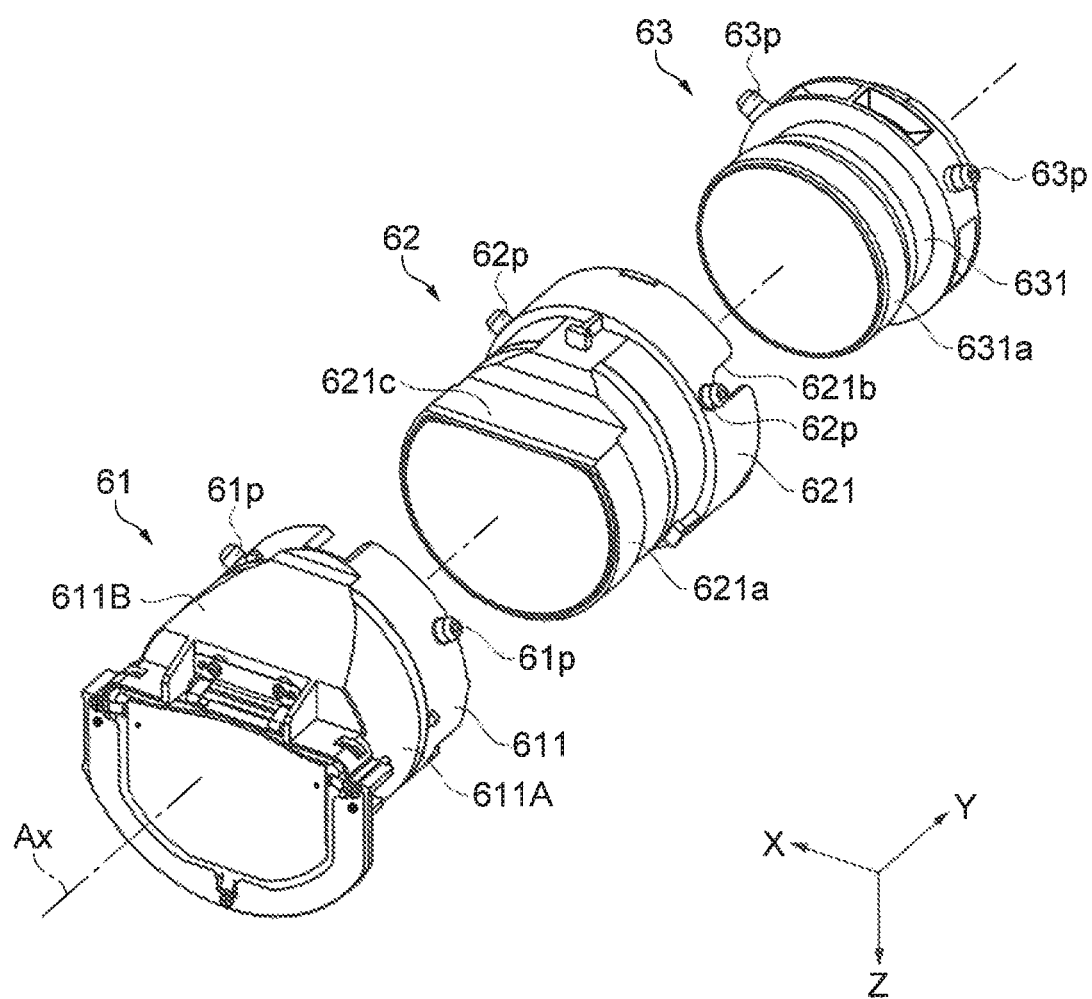
FIG. 6 is a perspective view of a first lens frame, a second lens frame, and a third lens frame of the present embodiment.

FIG. 6 is a perspective view illustrating the first lens frame 61, the second lens frame 62, and the third lens frame 63.

As illustrated in FIG. 6, the first lens frame 61 is formed in such a way that the cam pin 61p is formed in the vicinity of the +Y side end portion of the holding portion 611 and as illustrated in FIG. 3 and FIG. 4, the −Y side of the holding portion 611 protrudes from the cam barrel 66. Apart protruding from the cam barrel 66 of the holding portion 611 is set as a frame protruding portion 611A. The optical projection device 5 of the present embodiment is configured to be able to allow a state in which a protrusion amount from the cam barrel 66 of the holding portion 611, that is, a length of the frame protruding portion 611A in the direction along the optical axis Ax becomes approximately equal to a length of the cam barrel 66 in the direction along the optical axis Ax. The optical projection device 5 may be configured in such a way that the length of the frame protruding portion 611A in the direction along the optical axis Ax becomes clearly shorter than the length of the cam barrel 66 in the direction along the optical axis Ax.

In the frame protruding portion 611A, as illustrated in FIG. 4, the notch 611B formed in such a way that a portion of the end portion of the light emission side (second optical system 7 side) is cut out is provided at the −Z side, that is, the side through which light reflected by the reflection mirror 71 passes. The notch 611B is positioned at the inner side of the inclination portion 521 of the cover 51B and is inclined to approach the optical axis Ax as it goes from the vicinity of the cam barrel 66 to the second optical system 7.

The inclination portions 521 and the notch 611B are set to be substantially parallel to a ray of light Ri at a position closest to the first optical system 6 side among light beams reflected in the reflection mirror 71. The shape of the notch 611B is not limited to a planar shape and may include a stepped shape or the like as long as the notch 611B is inclined in its entirety. As illustrated in FIG. 4, the first lens group L1 is held in the −Y side of the notch 611B within the frame protruding portion 611A.

As illustrated in FIG. 4, the second lens frame 62 is formed in such a way that the cam pin 62p is formed in the vicinity of the +Y side end portion of the holding portion 621 and the −Y side of the holding portion 621 is able to be inserted into the holding portion 611 of the first lens frame 61. That is, the second lens frame 62 is formed in such a way that the −Y side of the holding portion 621 protrudes from the cam barrel 66, similar to the first lens frame 61. In the holding portion 621, a part capable of being inserted into the holding portion 611 is set as an insertion portion 621a.

In the insertion portion 621a, as illustrated in FIG. 4, a frame notch 621c positioned at the inner side of the notch 611B of the first lens frame 61 and formed in such a way that a portion thereof is cutout is provided. The frame notch 621c has a shape so that a cross-sectional shape of the insertion portion 621a becomes an L shape. The second lens group L2 is held inside of the frame notch 621c and the second lens frame 62 is disposed such that at least a portion of the second lens group L2 is movable to the inside of the notch 611B in the first lens frame 61.

In the holding portion 621, as illustrated in FIG. 6, a clearance portion 621b into which the cam pin 63p of the third lens frame 63 can be infiltrated by movement of the second lens frame 62 and the third lens frame 63 and which is cut out in a U shape is formed.

As illustrated in FIG. 4, the third lens frame 63 is formed in such a way that the cam pin 63p is formed in the vicinity of the +Y side end portion of the holding portion 631 and the −Y side of the holding portion 631 is able to be inserted into the holding portion 621 of the second lens frame 62. In the holding portion 631, a part capable of being inserted into the holding portion 621 is set as an insertion portion 631a. The third lens group L3 is held within the insertion portion 631a.

As described above, the guide barrel 65 includes the fitting portion 65A and the barrel protruding portion 65B, as illustrated in FIG. 3, the barrel protruding portion 65B is able to allow the frame protruding portion 611A to be disposed inside thereof and has a shape obtained by removing a portion so as to expose the notch 611B. An end surface 65Ba formed to be removed is inclined to imitate the notch 611B.

The inclination portion 521 (see FIG. 4) of the cover 51B is formed to approach the notch 611B in a range in which the inclination portion 521 does not abut the notch 611B in a state where the first lens frame 61 is moved to aside closest to the −Y side.

Accordingly, light emitted from the first optical system 6 and is reflected by the reflection mirror 71, as illustrated in FIG. 4, is transmitted through the light transmitting plate 53, is passed through the vicinity of the inclination portion 521 of the cover 51B, and is projected onto the screen SC.

As described above, according to the present embodiment, it is possible to obtain the following effects.

(1) The first lens frame 61 is supported in such a way that the frame protruding portion 611A protrudes from the cam barrel 66 and the cam pin 61p is engaged with the cam groove 661. The notch 611B is formed at an end portion of the light emission side (second optical system 7 side) of the frame protruding portion 611A. With this, it becomes possible to provide a configuration in which the cam barrel 66 can be miniaturized in the direction along the optical axis Ax and the cam barrel 66 can be arranged at the light incidence side with respect to the first lens frame 61, and the first lens frame 61 is guided even when the guide barrel 65 is formed not to have a shape in a region outside from the vicinity of the notch 611B.

The optical projection device 5 is configured in such a way that light emitted from the first optical system 6 and reflected by the second optical system 7 passes through the vicinity of the first optical system 6 and the notch 611B is formed on the first lens frame 61. With this, it is possible to from a region in which light reflected by the second optical system 7 is not shielded by the first optical system 6 to be wider, compared to a configuration in which the cam barrel is formed to cover almost all of the first lens frame. Accordingly, it is possible to provide the optical projection device 5 disposed close to the projection surface and capable of further widening an angle.

(2) The notch 611B is inclined to approach the optical axis Ax as it goes to the second optical system 7. With this, it is possible to widely form the region in which light reflected by the second optical system 7 is not shielded by the first optical system 6 and it becomes possible to provide a space in which a member (for example, as illustrated in FIG. 4, a portion of the second lens group L2 or a part of the −Z side for holding the second lens group L2 in the second lens frame 62) can be disposed at the notch 611B inside the frame protruding portion 611A and a region in the vicinity of the cam barrel 66. Accordingly, it becomes possible to provide the optical projection device 5 in which miniaturization due to efficient arrangement of constitutional members is achieved or optical performance is enhanced.

(3) The second lens frame 62 is disposed in such a way that at least a portion of the second lens group L2 is movable to the inner side of the notch 611B in the first lens frame 61. With this, since it is possible to make the notch 611B larger, it becomes possible to provide the optical projection device 5 disposed closer to the projection surface and achieving further widening of an angle.

(4) The guide barrel 65 includes the barrel protruding portion 65B which protrudes from the cam barrel 66 to the light emission side (second optical system 7 side) and the barrel protruding portion 65B is formed in such a way that a portion of the outer peripheral edge thereof is removed so as to expose notch 611B from the barrel protruding portion 65B. With this, it becomes possible to provide a configuration in which the region in which light reflected by the reflection mirror 71 is not shielded by the first optical system 6 can be formed to be wider and the frame protruding portion 611A of the first lens frame 61 protruding from the cam barrel 66 is guided using the barrel protruding portion 65B.

Furthermore, since the first lens frame 61 to the third lens frame 63 can be inserted into the guide barrel 65 from the light emission side of the guide barrel 65, it becomes possible to provide a configuration in which the first lens frame 61 to the third lens frame 63 are assembled into the guide barrel 65 without being influenced by a shape (for example, a shape for fixing the fourth lens frame 64) of the light incidence side of the guide barrel 65.

(5) Since the first lens frame 61 to the third lens frame 63 are lenses contributing to focus adjustment, it becomes possible to provide a optical projection device in which focal length adjustment or field curvature adjustment is possible and which is disposed close to the projection surface and achieves further widening of an angle.

(6) Since respective cam pins 61p, 62p, and 63p and respective holding portions 611, 621, and 631 are integrally formed, it is possible to easily combine respective lens frames in a state of holding respective lens groups, the guide barrel 65, and the cam barrel 66.

Furthermore, the cam pins 61p, 62p, and 63p are formed in a tapered shape in which tip portions become gradually thinner toward an end edge and the cam groove 661 is formed on the inner surface of the cam barrel 66 and has a cross-sectional shape with which the tip portions of the cam pins 61p, 62p, and 63p are engaged. With this, it becomes possible to form the cam barrel 66 to be small in the radial direction or form the interval between the adjacent cam grooves 661 to be small, compared to a configuration in which the cam groove is formed as a through hole and a cylindrical cam follower having the same function as the cam pins 61p, 62p, and 63p is fixed to a lens frame from the outside of the cam barrel by a screw. Accordingly, it becomes possible to provide the optical projection device 5 in which the cam barrel 66 is easily arranged in the region in which light reflected by the second optical system 7 is not shielded and the degree of freedom of formation of the cam groove 661 is enhanced.

(7) Since the projector 1 includes the optical projection device 5, it becomes possible that the projector 1 is disposed close to the projection surface and an angle of an image is widened and projected.

Modification Example

The embodiment described above may also be changed as in the following.

Although the notch 611B is formed to be inclined in the embodiment described above, the notch 611B may be cut out such that a cross-sectional shape becomes an L shape similar to the frame notch 621c in the second lens frame 62.

Although the frame notch 621c is formed to have the cross-sectional shape of an L, the frame notch 621c in the embodiment described above may be formed to be inclined to approach the optical axis Ax as it goes to the second optical system 7.

Although the movable lens groups are three (first lens group L1 to third lens group L3) in the configuration of the first optical systems 6 of the embodiment described above, the number of lens groups is not limited to three and a configuration in which the number of lens groups is one or two, and otherwise, may be four or more may be adopted.

The first optical system 6 may be configured in such a way that the lens group fixed to the guide barrel 65 is disposed at the light emission side of the first lens group L1.

In the embodiment described above, although a configuration in which the first lens frame 61 and the second lens frame 62 protrude from the cam barrel 66, a configuration in which at least the first lens frame 61 protrudes from the cam barrel 66 may be adopted.

A configuration in which the cam barrels 66 is rotated electrically using a motor or the like may be adopted.

Although a transmissive liquid crystal panel is utilized as an optical modulation device in the projector 1 of the embodiment described above, a projector utilizing a reflective liquid crystal panel may be adopted. A projector which utilizes a micromirror type optical modulation device, for example, a digital micromirror device (DMD), as the optical modulation device may be adopted.

The optical modulation device of the embodiment described above adopts a so-called three-plate system using three optical modulation devices corresponding to R light, G light, and B light, but is not limited thereto. The optical modulation device of the embodiment described above may adopt a single-plate system, or may also be applied to a projector including two or four or more optical modulation devices.

The light source device 31 is not limited to one which uses a discharge type lamp and may be configured with another type of lamp or a light emission diode, a solid light source such as a laser.

The entire disclosure of Japanese Patent Application No. 2015-13024, filed Jan. 27, 2015 and Japanese Patent Application No. 2015-129588, filed Jun. 29, 2015 are expressly incorporated by reference herein.

The invention claimed is:

1. An optical projection device comprising:
a first optical system including lens groups movable along an optical axis; and
a second optical system reflecting light emitted from the first optical system,
wherein the first optical system includes
a first lens frame which holds a first lens group positioned at a side closest to the second optical system side among the movable lens groups and includes a cam pin protruding in a direction orthogonal to the optical axis,
a guide barrel which includes a straight groove along the optical axis and in which the cam pin is inserted into the straight groove, and
a cam barrel which includes a cam groove into which the guide barrel is fitted and with which the cam pin protruding from the straight groove is engaged, is rotated with respect to the guide barrel to guide the cam pin by the straight groove and the cam groove, and moves the first lens frame along the optical axis,
the first lens frame includes a frame protruding portion protruding from the cam barrel to a second optical system side and holding the first lens group, and
a notch is provided in such way that a portion of an end portion of the second optical system side is formed to be cut out at a side through which light reflected by the second optical system passes, in the frame protruding portion.

2. The optical projection device according to claim 1,
wherein the notch is inclined to approach the optical axis as it goes to the second optical system.

3. A projector comprising:
a light source;
an optical modulation device that modulates light emitted from the light source according to image information; and
the optical projection device according to claim 2 that projects light modulated by optical modulation device.

4. The optical projection device according to claim 1,
wherein the first optical system includes a second lens group disposed at a light incidence side of the first lens group and a second lens frame holding the second lens group and including the cam pin guided by the straight groove and the cam groove, and
the second lens frame is disposed in such a way that at least a portion of the second lens group is movable to the inside of the notch in the first lens frame.

5. A projector comprising:
a light source;

an optical modulation device that modulates light emitted from the light source according to image information; and the optical projection device according to claim 4 that projects light modulated by optical modulation device.

6. The optical projection device according to claim 1, wherein the guide barrel includes a barrel protruding portion which protrudes from the cam barrel to the second optical system side, and the barrel protruding portion is able to dispose the frame protruding portion inside and has a shape to be removed so as to expose the notch.

7. A projector comprising:

a light source;

an optical modulation device that modulates light emitted from the light source according to image information; and the optical projection device according to claim 6 that projects light modulated by optical modulation device.

8. The optical projection device according to claim 1, wherein the first lens group is the lens contributing to focus adjustment.

9. A projector comprising:

a light source;

an optical modulation device that modulates light emitted from the light source according to image information; and the optical projection device according to claim 8 that projects light modulated by optical modulation device.

10. The optical projection device according to claim 1, wherein the first lens frame holds the first lens group and includes a holding portion fitted into the guide barrel, the cam pin is integrally formed with the holding portion and has a tapered shape in which a tip portion becomes gradually thinner toward an end edge, and the cam groove is formed at the inner surface of the cam barrel and has a cross-sectional shape with which the tip portion is engaged.

11. A projector comprising:

a light source;

an optical modulation device that modulates light emitted from the light source according to image information; and the optical projection device according to claim 10 that projects light modulated by optical modulation device.

12. A projector comprising:

a light source;

an optical modulation device that modulates light emitted from the light source according to image information; and the optical projection device according to claim 1 that projects light modulated by optical modulation device.

* * * * *